(12) United States Patent
Lee et al.

(10) Patent No.: US 7,032,698 B2
(45) Date of Patent: Apr. 25, 2006

(54) HOVERCRAFT

(75) Inventors: Chun Wah Lee, Hong Kong (HK); Robert Paul Spalinski, Titusville, NJ (US); Matthew James Del Duke, Audubon, NJ (US); Justin Discoe, Merchantville, NJ (US); Chow Ming Lau, Hong Kong (HK)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/968,392

(22) Filed: Oct. 19, 2004

(65) Prior Publication Data

US 2005/0194196 A1    Sep. 8, 2005

Related U.S. Application Data

(60) Provisional application No. 60/519,137, filed on Nov. 12, 2003.

(51) Int. Cl.
*B60V 1/14* (2006.01)
(52) U.S. Cl. .................. 180/117; 180/128; 180/129
(58) Field of Classification Search ............... 180/117, 180/125–129
See application file for complete search history.

(56) References Cited

U.S. PATENT DOCUMENTS

| 3,331,462 A | * | 7/1967 | Wernicke | 180/129 |
| 3,458,007 A | * | 7/1969 | Todd | 180/128 |
| 3,587,771 A | * | 6/1971 | Faure | 180/120 |
| 3,608,662 A | * | 9/1971 | Ferguson | 180/117 |
| 4,828,058 A | * | 5/1989 | Bjorn-Ake | 180/116 |

\* cited by examiner

*Primary Examiner*—Lesley D. Morris
*Assistant Examiner*—Matthew Luby
(74) *Attorney, Agent, or Firm*—Akin Gump Strauss Hauer & Feld, LLP

(57) ABSTRACT

A hovercraft is capable of operation on either a solid surface or a liquid surface. The hovercraft includes a hull on which is mounted at least one thrust-lift fan assembly for providing an air cushion under the hovercraft and for propelling the hovercraft in a forward or reverse direction. The hovercraft also includes a steering fan assembly mounted transversely to the thrust-lift fan assembly and that allows the hovercraft to be steered in any lateral direction. The hovercraft is controlled by operation of the fans in the appropriate direction, and may be in the form of a wireless remote control toy.

22 Claims, 8 Drawing Sheets

HOVERCRAFT

CROSS-REFERENCE TO RELATED APPLICATIONS

This application is entitled to priority, pursuant to 35 U.S.C. § 119(e), to U.S. Provisional Patent Application No. 60/519,137, filed Nov. 12, 2003.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention generally relates to a hovercraft vehicle, and particularly a hovercraft vehicle having a new steering mechanism. The hovercraft may be of full size and made of such materials to transport people and objects, or may be of miniaturized dimensions and cable of being remotely controlled and useful as a toy.

BRIEF SUMMARY OF THE INVENTION

One aspect of the invention is a hovercraft comprising a hull having a forward end and an aft end, first and second lateral sides and upper and lower sides, a central longitudinal axis between the first and second lateral sides, the hull providing sufficient buoyancy to allow the hovercraft to float on a supporting liquid; a support structure supported by or formed unitarily with the hull; a cavity disposed within the hull and having an opening in the lower side, the cavity being surrounded by the hull in a first side portion, a second side portion, a forward end portion and an aft end portion; the hull further comprising a circumferential lower side portion extending from the first and second side portions, forward end portion and aft end portion, the circumferential lower side portion surrounding the cavity opening; a thrust-lift fan assembly including a thrust-lift fan housing mounted to at least one of the hull and the support structure, the thrust-lift fan housing including a thrust-lift fan duct; a thrust-lift fan motor disposed within the thrust-lift fan housing and drivingly coupled with a thrust-lift fan, the thrust-lift fan being supported for rotation within the thrust-lift fan duct; the thrust-lift fan duct having an inlet, an aft outlet, and a bottom outlet in fluid communication with the cavity and a supporting surface under the hull; a steering fan assembly including a steering fan housing fixedly mounted to at least one of the support structure and the hull; a steering fan motor having an axis of rotation generally perpendicular to the central longitudinal axis and being drivingly coupled with a reversible steering fan supported for selective rotation in one of a first direction and in a second direction within the steering fan housing; whereby operation of the thrust-lift fan causes air to be expelled through the bottom outlet to generate a lifting force on the hovercraft sufficient to lift the hovercraft from the supporting surface and also causes air to be expelled through the aft outlet to generate a propulsive force on the hovercraft to propel the hovercraft in a forward direction; and whereby operation of the steering fan in the first direction of rotation generates a first side force tending to steer the hovercraft toward one of the lateral sides and in the second direction of rotation generates a second side force tending to steer the hovercraft toward the other lateral side.

Another aspect of the invention relates to a toy hovercraft comprising a hull having a forward end and an aft end, first and second lateral sides and upper and lower sides, a central longitudinal axis between the first and second lateral sides, the hull providing sufficient buoyancy to allow the toy hovercraft to float on a supporting liquid; a support structure supported by or formed unitarily with the hull; a cavity disposed within the hull and having an opening in the lower side, the cavity being surrounded by the hull in a first side portion, a second side portion, a forward end portion and an aft end portion; the hull further comprising a circumferential lower side portion extending from the first and second side portions, forward end portion and aft end portion, the circumferential lower side portion surrounding the cavity opening; an electrical power source; a thrust-lift fan assembly including a thrust-lift fan housing mounted to at least one of the hull and the support structure, the thrust-lift fan housing including a thrust-lift fan duct; an electric thrust-lift fan motor disposed within the thrust-lift fan housing and operatively coupled to the electrical power source and drivingly coupled with a thrust-lift fan, the thrust-lift fan being supported for rotation within the thrust-lift fan duct; the thrust-lift fan duct having an inlet, an aft outlet, and a bottom outlet in fluid communication with the cavity and a supporting surface under the hull; a steering fan assembly including a steering fan housing fixedly mounted to at least one of the support structure and the hull; an electric, reversible steering fan motor having an axis of rotation generally perpendicular to the central longitudinal axis and being operatively coupled to the electrical power source and drivingly coupled with a steering fan supported for selective rotation in one of a first direction and in a second direction within the steering fan housing; whereby operation of the thrust-lift fan causes air to be expelled through the bottom outlet to generate a lifting force on the hovercraft sufficient to lift the toy hovercraft from the supporting surface and also causes air to be expelled through the aft outlet to generate a propulsive force on the hovercraft to propel the toy hovercraft in a forward direction; and whereby operation of the steering fan in the first direction of rotation generates a first side force tending to steer the toy hovercraft toward one of the lateral sides and in the second direction of rotation generates a second side force tending to steer the toy hovercraft toward the other lateral side.

Yet another aspect of the invention relates to a wireless remote control toy hovercraft set comprising the toy hovercraft as set forth above and a wireless remote control toy hovercraft set comprising the toy hovercraft of claim 10 and a wireless remote control transmitter assembly, the wireless remote control transmitter assembly comprising a transmitter for transmitting signals to a receiver and a power source; a receiver assembly associated with the hovercraft and comprising a receiver for receiving signals transmitted from the transmitter assembly, and a power source; electronic circuitry adapted for causing the thrust-lift fan motor to turn on and off when a first control button on the transmitter assembly is respectively activated and not activated, the electronic circuitry also adapted for causing the steering fan motor to turn on in the first direction, to turn on in the second direction and to turn off when a second control button is respectively activated in first and second on positions and in an off position.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
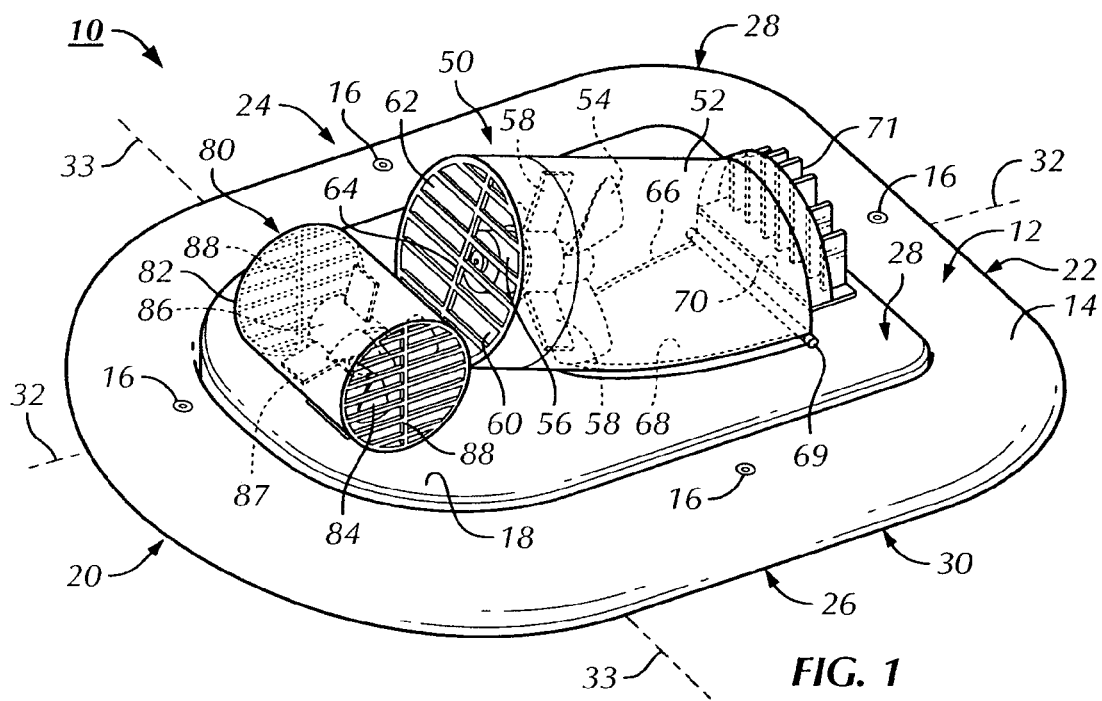
FIG. 1 is an upper front isometric view of the forward end or bow of one embodiment of a hovercraft in accordance with the present invention in which a thrust-lift fan duct flap is in a closed position.

Certain terminology is used in the following description for convenience only and is not limiting. The words "right", "left", "forward", "rear", "aft", "upper" and "lower" designate directions in the drawings to which reference is made. The terminology includes the words specifically mentioned above, derivatives thereof, and words of similar import. In addition, the article "a" or "an" or reference to a singular component includes the plural of more than one of the components, unless specifically and explicitly restricted to the singular or a single component, and unless otherwise clear from the context containing the term.

The invention will now be described in detail with reference to the drawings, wherein like numerals indicate like elements throughout the several views.

FIGS. 1 through 5 illustrate one embodiment of a hovercraft 10 according to the present invention. The hovercraft 10 may be a full-sized, fully functional hovercraft capable of supporting and transporting people and objects, or it may be a miniaturized hovercraft capable of use as a toy, which may be remotely controlled using a wireless transmitter and receiver. The primary differences between a full-sized hovercraft and a miniaturized toy hovercraft are the size, the strength and nature of the materials used to make it, the size and power of the components to drive it, and other such differences as will be apparent to those of skill in the art of full-sized hovercraft and toy hovercraft, in view of the present disclosure. For the sake of convenience, most of the descriptions of the hovercraft of the present invention will be with reference to a toy hovercraft, keeping the distinctions between a full-sized hovercraft and a toy hovercraft in mind.

With reference primarily to FIGS. 1–5, the first embodiment of the hovercraft 10 comprises a hull 12, a thrust-lift fan assembly 50 and a steering fan assembly 80 as its major components. As used herein, the term "hull" includes the complete support structure of the hovercraft, including the bottom, sides and interior support structure of the hovercraft.

The hull 12 is made of a material that provides sufficient buoyancy to allow the hovercraft to float on a supporting liquid, such as water, preferably. The hull material may be of synthetic open-cell or closed-cell foam polymeric material, such as polypropylene foam or expanded polypropylene foam, for example, which may be encased within fiberglass or any other synthetic polymeric material. The hull may also be made of wood or other naturally buoyant material, or it may be made of hollow components of any material, including metal, polymeric, composite or laminated materials, and may be in the form of pontoons or one or more tubes, to provide the desired buoyancy. As shown in the embodiment of FIGS. 1–5, the hull preferably, but not necessarily, includes a float member, preferably in the form of a circumferential tube 14 made of inflatable material, such as natural or synthetic rubber, neoprene, or preferably a synthetic polymeric material such as polyvinylchloride, polypropylene, polyethylene or other suitable polymer, that is air-impervious and has a smooth outer surface. Such a smooth surface is desirable for helping to maintain a suitable air cushion to support the hovercraft above a surface, and preferably a solid surface. Composite or laminated materials may be used to provide these characteristics, if desired. The circumferential tube 14 may be made of several sections in case any of them becomes punctured, with an inflation valve 16 in each section forming the circumferential tube 14. Making the float member inflatable would reduce the volume of the hovercraft for shipping purposes.

The hovercraft 10 includes a forward end or bow 20, an aft end 22, a first lateral side, such as starboard side 24, a second lateral side, such as port side 26, an upper side 28, and a lower side 30. In normal operation, prior to activating the thrust-lift fan assembly 50, the hovercraft 10 is oriented with the lower side 30 downward, resting on a supporting surface, which may be a solid surface or a liquid, typically water.

Figure 2:
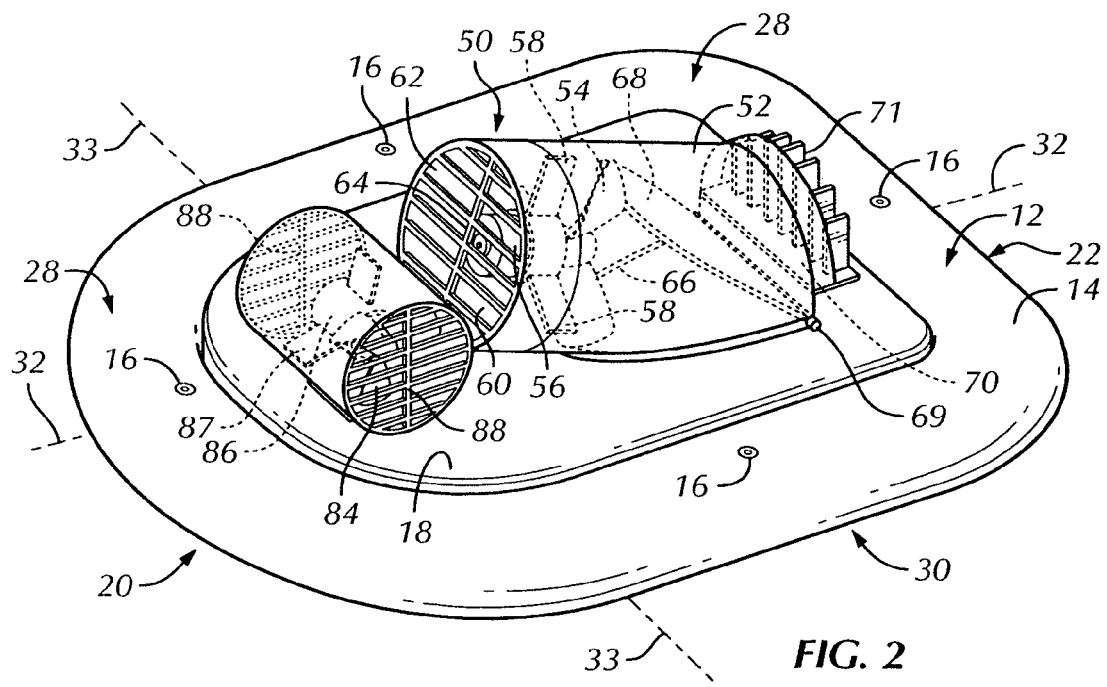
FIG. 2 is an upper front isometric view of the hovercraft embodiment of FIG. 1 in which the thrust-lift fan duct flap is in an open position.

The hovercraft 10 includes a central longitudinal axis 32, best seen in FIGS. 1 and 2, along which the thrust-lift fan assembly is centrally mounted onto a support structure 18 that may be in the form of a platform or any other suitable support structure that forms part of or is unitarily formed with the hull 12. A transverse axis 33 that is perpendicular to the central longitudinal axis defines an axis of rotation along which the steering fan assembly 80 is mounted on the support structure 18.

Figure 4:
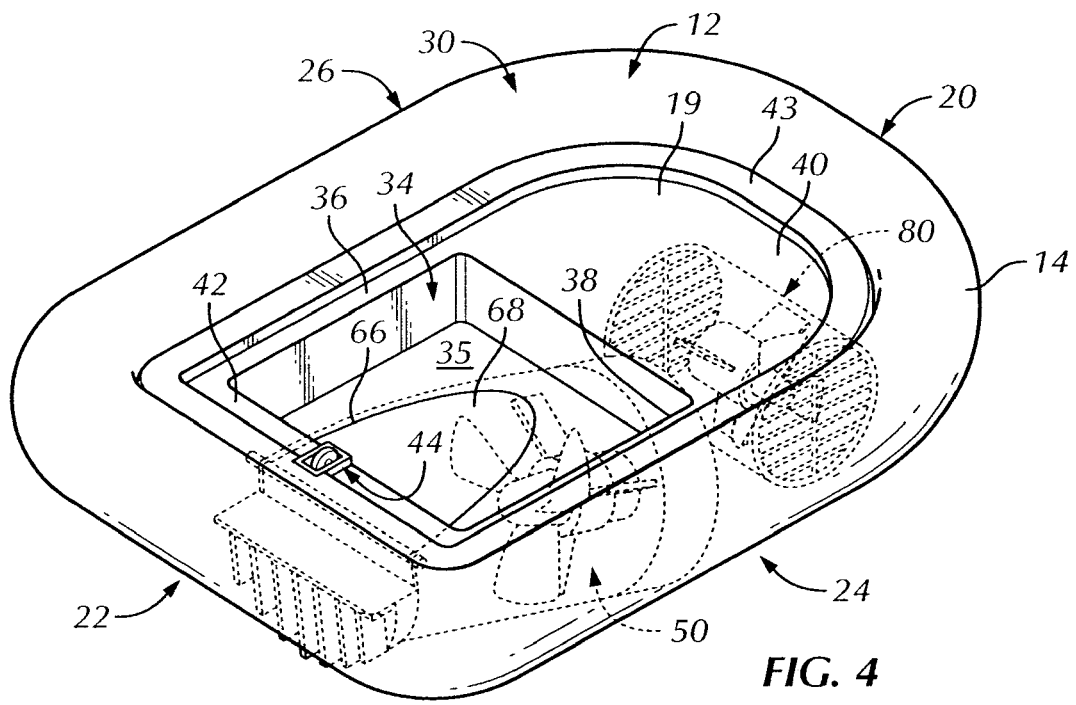
FIG. 4 is a bottom, rear isometric view of the hovercraft embodiment of FIG. 1 showing the thrust-lift fan duct flap in a closed position.
Figure 5:
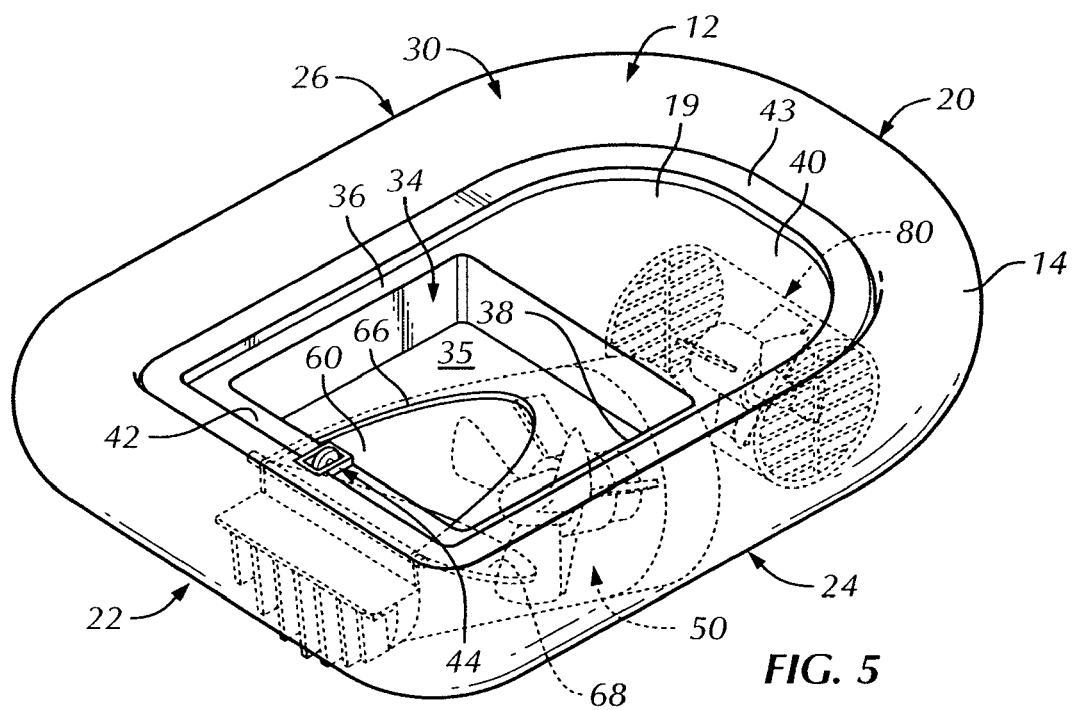
FIG. 5 is a bottom, rear isometric view of the hovercraft embodiment of FIG. 1 showing the thrust-lift fan duct flap in an open position.
Figure 6:
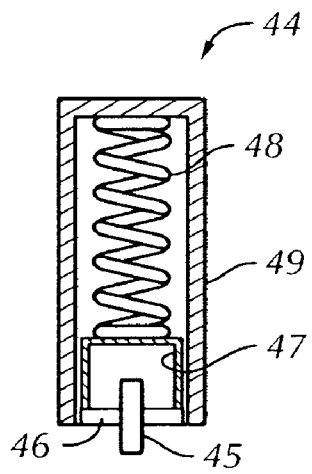
FIG. 6 is a partial rear elevational and partial vertical cross-sectional view of one embodiment of a spring-mounted wheel assembly useful in the hovercraft of the present invention.
Figure 7:
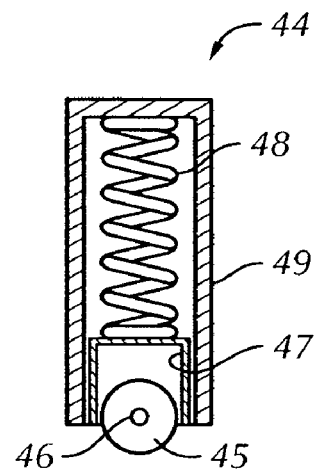
FIG. 7 is a partial side elevational and partial vertical cross-sectional view of the spring-mounted wheel assembly of FIG. 6.
Figure 8:
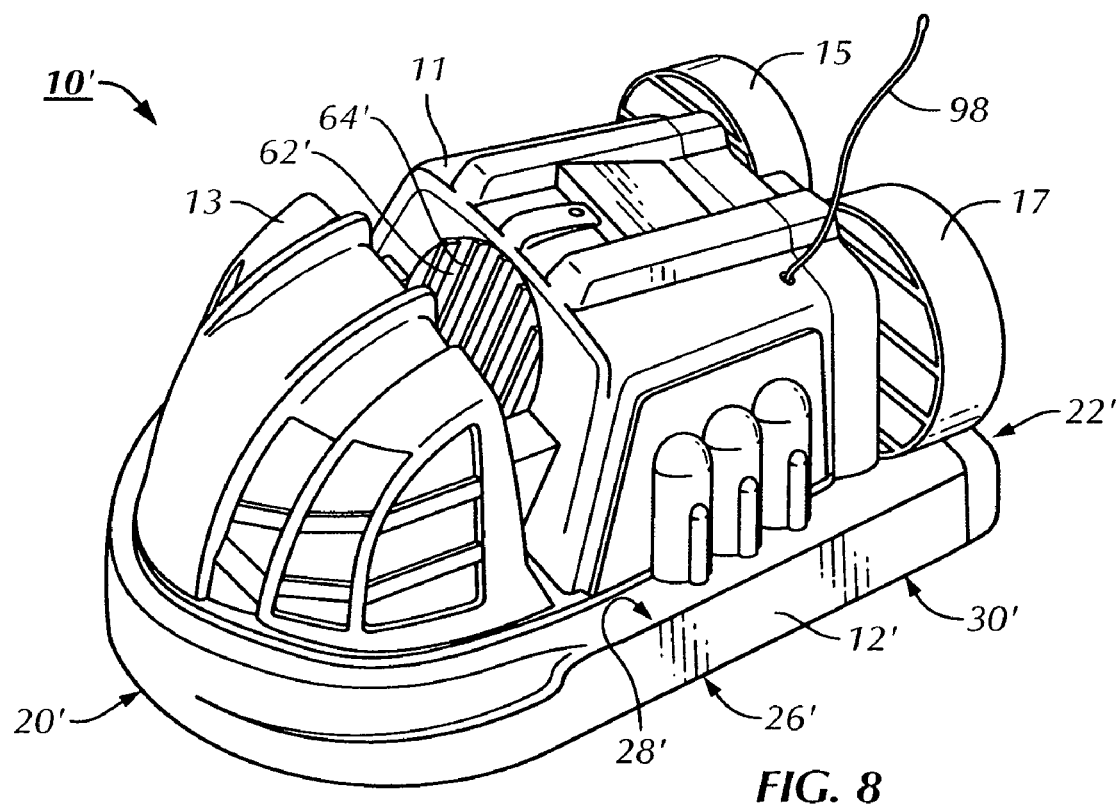
FIG. 8 is an upper side isometric view of a second embodiment of a hovercraft, preferably for use as a toy, in accordance with the present invention.
Figure 9:
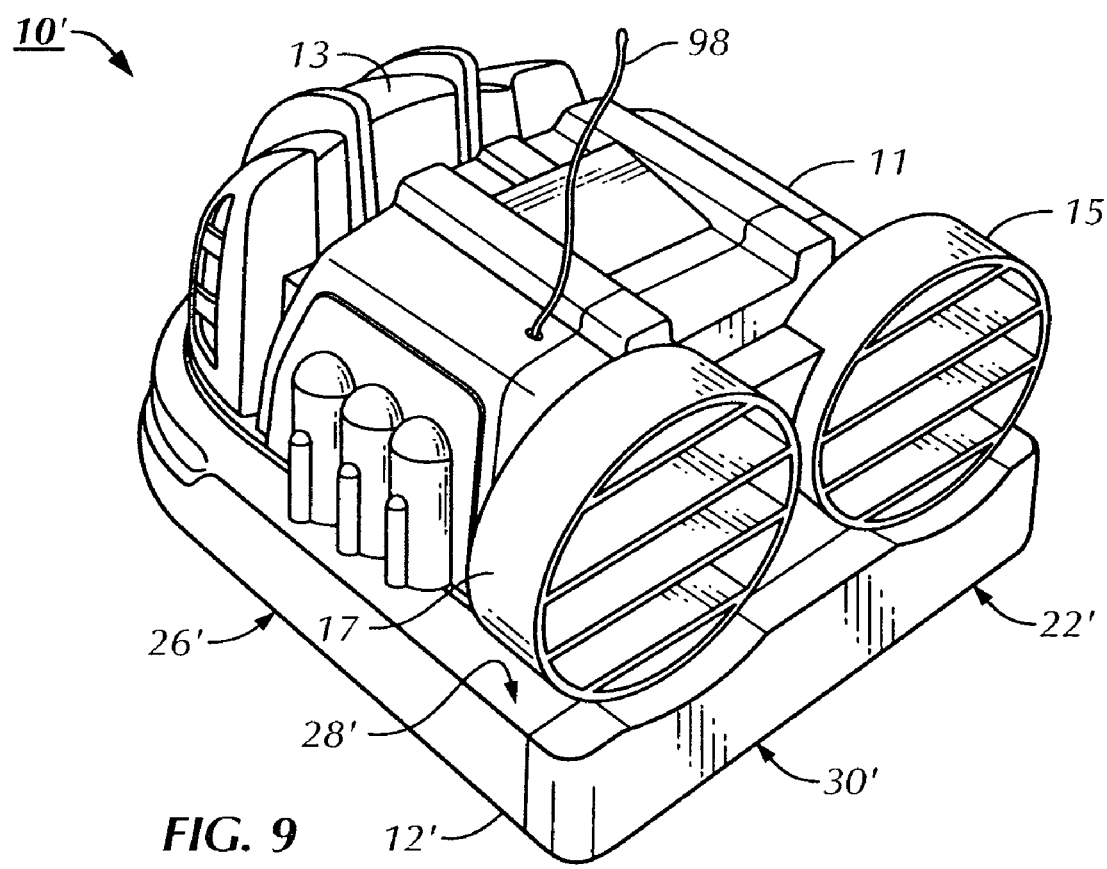
FIG. 9 is a rear isometric view of the hovercraft of FIG. 8.

With reference to FIGS. 4 and 5, the hull 12 includes a cavity 34 which may be formed unitarily with the support structure 18, as by hollowing out a portion of the support structure or by forming the support structure with the cavity, as by any suitable, well-known molding technique. The cavity is defined by an underside portion 19 of the hull, including the support structure 18, by a first side portion 36, illustrated as being on the starboard side, a second side portion 38, illustrated as being on the port side, a forward portion 40 and an aft portion 42. The cavity has an upper wall 35 and an opening in the lower side 30 of the hovercraft 10, by which air in the cavity communicates with the lower side 30 and may form an air cushion to support the hovercraft 10 above a surface when the thrust-lift assembly is activated. The lower edges of the opening defining the cavity preferably are coextensive with the underside portion 19 of the hull, which may be the underside of the support structure 18, especially where the support structure 18 is formed unitarily with the hull 12.

A circumferential lower side portion or ledge 43 surrounds the cavity 34 and may be spaced laterally, as well as forward and aft of the inner wall edges of a further recessed cavity 34. While the embodiment of the hovercraft 10 shown in FIGS. 4 and 5 shows a separate circumferential lower side portion or ledge 43, the lower surface of the circumferential tube float member 14 may substitute as the circumferential lower side portion. The circumferential lower side portion in the form of the ledge 43 or the lower surface of the circumferential tube float member 14 provides the bottom of the hovercraft and is the portion of the hovercraft which contacts the solid or liquid support surface that supports the hovercraft in operation. As such, it is preferably smooth and capable of enhancing an air cushion for supporting the hovercraft 10.

With reference to FIGS. 4 through 7, a guide wheel assembly 44 is supported near the aft end 22 of the hovercraft 10, preferably aligned with the central longitudinal axis 32, and preferably within the hull underside aft portion 42. One embodiment of a suitable guide wheel assembly 44 is illustrated in more detail in FIGS. 6 and 7. The guide wheel assembly 44 includes a guide wheel 45 mounted for rotation about a substantially horizontal axis as represented by an axle 46. The axle 46 is supported by an internal support structure 47 that includes a spring 48, preferably a compression coil spring, within a guide wheel assembly housing 49. The housing is embedded within and attached to the hull 12, preferably, as mentioned above, within the hull underside aft portion 42. The guide wheel assembly 44 is mounted such that the guide wheel 45 extends below the lower side 30 of the hovercraft. The spring 48 biases the guide wheel 45 substantially vertically in a lowermost position within the guide wheel assembly housing 49 so that the guide wheel 45 maintains contact with a solid surface on which the hovercraft 10 may be traveling to aid in controlling the travel of the hovercraft 10 by causing it generally to track in a straight line when the hovercraft is operated on a smooth solid surface in the absence of steering forces being applied to it as described below.

Figure 3:
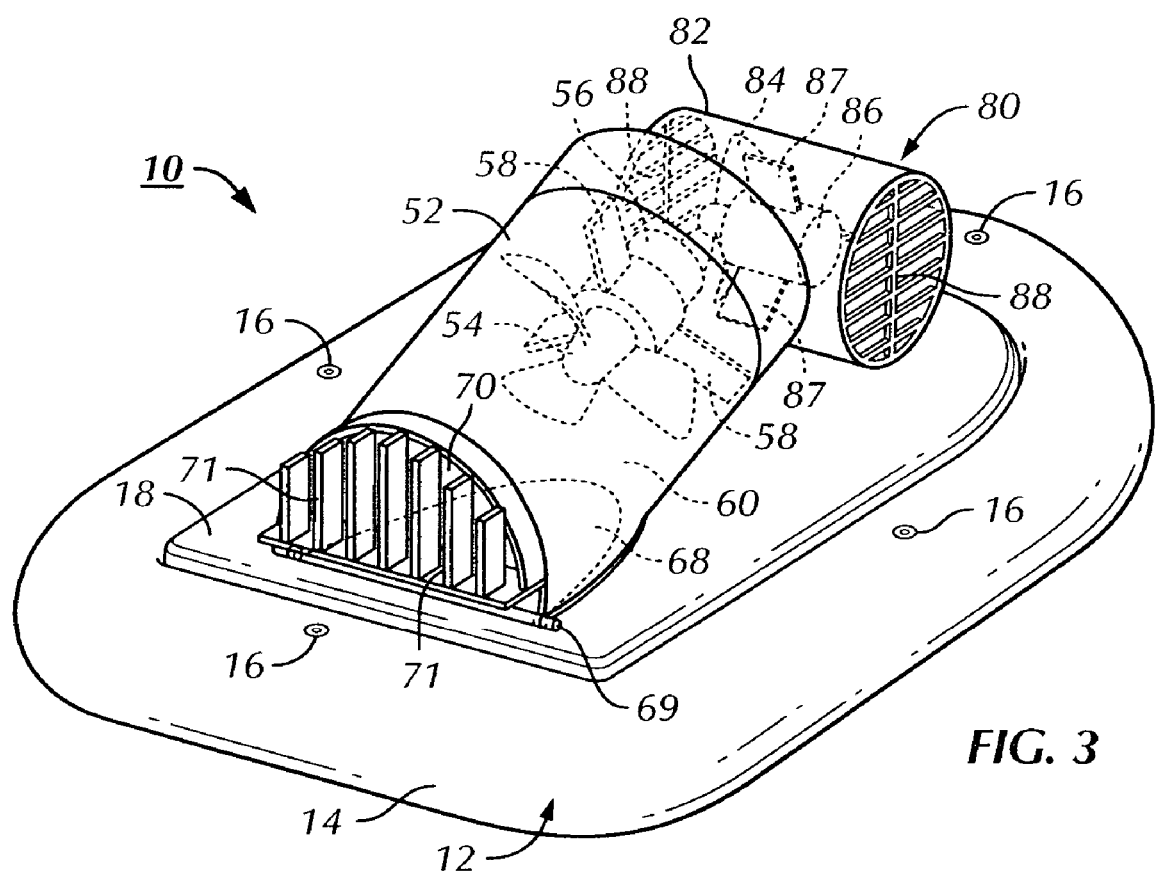
FIG. 3 is an upper rear isometric view of the aft end of the hovercraft embodiment of FIG. 1.

With reference primarily to FIGS. 1 through 3, and secondarily to FIGS. 4 and 5, the hovercraft 10 includes a thrust-lift fan assembly 50. If desired or necessary to generate appropriate thrust and lifting forces, more than one thrust-lift fan assembly 50 may be included in the hovercraft, mounted adjacent to each other and generally aligned with the central longitudinal axis 32. The components of the thrust-lift fan assembly 50 cause the hovercraft to be propelled in a forward direction (or in a reverse direction if operated in reverse) and lifted from a supporting surface and especially a solid supporting surface. The thrust-lift fan assembly 50 includes a thrust-lift fan housing 52 mounted at least to one of the hull 12 and the support structure 18. The housing 52 may be made of any suitable material, such as metal, synthetic polymeric material, composite or laminated materials, etc. A preferred material is an acrylonitrile butadiene styrene polymeric material. Within the thrust-lift fan housing 52 is a thrust-lift fan 54 driven by a thrust-lift fan motor 56 which is supported by thrust-lift fan motor supports 58 within the thrust-lift fan housing 52 and otherwise with respect to the hull 12 and support structure 18. The thrust-lift fan motor 56 may be any suitable motor capable of driving the thrust-lift fan 54 or more than one fan connected to the motor by suitable drive elements, such as gears, chains, belts, etc., or by a direct connection of the fan 54 to the motor drive shaft. Suitable motors for a full-size hovercraft would include, for example without limitation, a gasoline internal combustion engine, a diesel internal combustion engine, a gasoline or other hydrocarbon fuel rotary engine, among others.

For a toy hovercraft, the motor may be a miniature internal combustion engine or, preferably, an electric motor.

The thrust-lift fan housing 52 forms in its interior an internal thrust-lift fan duct 60 through which air travels from a thrust-lift fan duct inlet 62 and out through a thrust-lift fan duct bottom outlet 66, assuming that such outlet is open as shown in FIGS. 2 and 5, and/or through a thrust-lift fan duct aft outlet 70. A thrust-lift fan duct inlet grille 64 covers the thrust-lift fan duct inlet 62 to prevent foreign objects from entering into the thrust-lift fan duct 60.

A thrust-lift fan duct outlet flap 68 is mounted for pivotal movement between an open position and a closed position, in a first embodiment as shown in FIGS. 1–5 about a hinge 69 located in an aft portion of the support structure 18. FIGS. 1, 3 and 4 show the thrust-lift fan duct bottom outlet flap 68 in a closed position, while FIGS. 2 and 5 show the thrust-lift fan duct bottom outlet flap 68 in an open position, where the flap 68 opens within the thrust-lift fan duct 60. Any other orientation of the thrust-lift fan duct bottom outlet flap 68 is possible, so long as in its closed position, air is routed to the thrust-lift fan duct aft outlet 70, and in its open position, air is routed both to the thrust-lift fan duct bottom outlet 66 and to the thrust-lift fan duct aft outlet 70. The thrust-lift fan duct bottom outlet flap 68 preferably has sealing edges that abut the edges of the thrust-lift fan duct bottom outlet 66 when in the closed position. The sealing edges may be in the form of mating beveled edges and/or may include separate sealing elements, such as rubber, neoprene or other natural or synthetic gasket material.

The thrust-lift fan bottom outlet flap 68 may act as a deflector to deflect air to the appropriate outlet or outlets. Alternatively or additionally, a separate deflector may be used to deflect the air to the appropriate outlet or outlets. Where a deflector is used with a thrust-lift fan bottom outlet flap 68, it is preferred that the bottom outlet flap 68 is hingedly disposed adjacent a forward end of the deflector.

In a full-sized hovercraft, the thrust-lift fan duct bottom outlet flap 68 may be moved from an open position to a closed position, and vice versa, by any suitable mechanical, pneumatic or hydraulic components, not shown, and retained in the open or closed position by any suitable latch or catch mechanism, also not shown. Such components would be readily apparent to those of ordinary skill in the art in view of the present disclosure, and accordingly, further details relating to them are not believed to be necessary. For a toy hovercraft, the thrust-lift fan duct bottom outlet flap 68 may be moved from an open position to a closed position manually and need not even have a latch or catch mechanism as friction about the hinge 69 and/or friction between the edges of the flap 68 and the thrust-lift fan duct bottom outlet 66 or the housing 52 would be sufficient to maintain the flap 68 in its desired open or closed position.

As best seen in FIGS. 4 and 5, the thrust-lift fan duct bottom outlet 66 is in fluid communication with the cavity 34 when the flap 68 is in the open position. This allows a component of the air traveling through the thrust-lift fan duct bottom opening 66 to be directed via the opening of the cavity 34 below the hovercraft 10 to provide a lift force such that the hovercraft 10 may be supported on an air cushion in a well-known manner. The air cushion support is more important for the hovercraft 10 of the present invention when the hovercraft is traveling over a smooth solid surface, than when the hovercraft is traveling in a liquid.

Another component of air traveling through the thrust-lift fan duct 60 exits the duct through the thrust-lift fan duct aft outlet 70, preferably past fixed vanes 71. If desired, instead of having vanes 71 which help direct the air flow generally straight in planes parallel to the central longitudinal axis 32, an aft outlet grille may be substituted for such vanes 71. Alternatively, the thrust-lift fan duct aft outlet need not have any vanes 71 or any grille. As shown in FIGS. 1 through 5, the thrust-lift fan assembly 50, housing 52, fan 54, motor 56 and duct 60 are angled downwardly with respect to a horizontal plane at an angle such that most of the air is directed through the thrust-lift fan duct aft outlet 70, to provide a forward force to propel the hovercraft 10 in a forward direction (unless the direction of the fan is reversed, in which case the hovercraft would be propelled in a rearward direction).

The hovercraft 10 also includes a steering fan assembly 80 mounted on at least one of the hull 12 and the support structure 18. The steering fan assembly 80 contains components for steering the hovercraft in a direction other than in a direction corresponding to the central longitudinal axis 32. The steering fan assembly 80 is mounted on the hovercraft along the transverse axis 33 perpendicular to the central longitudinal axis 32. As shown in FIGS. 1 through 5, the steering fan assembly 80 is mounted in its preferred position forward of the thrust-lift fan assembly 50.

The steering fan assembly 80 includes a steering fan housing 82, a steering fan 84 driven directly or indirectly by any suitable linkages as described above with respect to the thrust-lift fan 54, by a steering fan motor 86. The steering fan housing 82 independently may be made of the same type of materials disclosed above with respect to the thrust-lift fan housing 52. The steering fan motor is mounted by steering fan motor supports 87 to the interior of the steering fan housing 82, to the support structure 18 and/or to the hull 12. Side grilles 88 on opposite sides of the steering fan housing 82 prevent foreign objects from entering into the steering fan housing. The steering fan motor may be any suitable type, as long as it is capable of driving the steering fan in opposite directions, as desired. Driving the steering fan in opposite directions may be accomplished by reversing the motor direction, or by switching gears or other suitable driving connections. Where the hovercraft 10 is a toy, the steering fan motor 86 preferably is a reversible electric motor. Where either or both of the thrust-lift fan motor 56 and the steering fan motor 86 are electric, a suitable power source 95 (not shown, except schematically in FIG. 13), such as an electric generator, or more preferably, a rechargeable or replaceable battery or batteries, are mounted or retained in a suitable location upon the hovercraft 10. Suitable electrical connectors, such as wires, would also be used in this instance. The mounting and electrical connections would be well known to those skilled in the art in view of the present disclosure, and therefore, no further explanation relating to them is believed to be necessary.

Operation of the steering fan 84 in a first direction of rotation, say clockwise for example, generates a first side force tending to steer the hovercraft toward one lateral side, and in a second direction of rotation, say counterclockwise for example, generates a second side force tending to steer the hovercraft toward the opposite lateral side.

Especially when the hovercraft 10 is traveling over a smooth solid surface, the thrust-lift bottom outlet flap 68 is opened, such that the thrust-lift fan 54 generates sufficient force to create an air cushion and lift the hovercraft over the surface, while also generating sufficient propulsion force to propel the hovercraft in a forward (or reverse) direction. The steering fan 84 is operated as desired to steer the hovercraft right or left (starboard or port). The air cushion does not have to be very extensive to support the hovercraft. The guide wheel 45 preferably extends below the lower surface in a manner to retain the hovercraft line of travel in a generally straight path, other than when the steering fan is activated to steer the hovercraft.

For operation in water, since the hull 12, with or without the circumferential tube float member 14, is buoyant, normally it is not necessary to create a lift force. Therefore, the thrust-lift duct bottom outlet flap 68 may be closed so that all of the air traveling through the thrust-lift fan duct 60 is directed aft through the thrust-lift fan duct aft outlet 70, unless the rotation of the thrust-lift fan 54 is reversed. Whether the thrust-lift fan 54 propels the hovercraft 10 in a forward or aft direction, while the hovercraft is on water, there will be greater efficiency to rely on the buoyancy rather than an air cushion to support the hovercraft.

FIGS. 8 through 13 relate to a wireless remote control toy hovercraft 10' according to the present invention. The toy hovercraft 10' operates in the same general manner and has the same general components as the toy form of the first embodiment of the hovercraft 10, except as otherwise set forth below. Since many of the components of the toy hovercraft 10' are the same as or the equivalent of the components described above with respect to the first embodiment of the hovercraft 10, primed reference numerals will be used to refer to the same or equivalent components and such components will not be described in detail, except to explain any differences. The toy hovercraft 10' also includes decorative housing elements 11 and 13 covering a thrust-lift fan assembly 50' and a steering fan assembly 80', respectively. The decorative housings 11 and 13 are shown as having been removed from the hovercraft 10' in FIG. 12.

Figure 11:
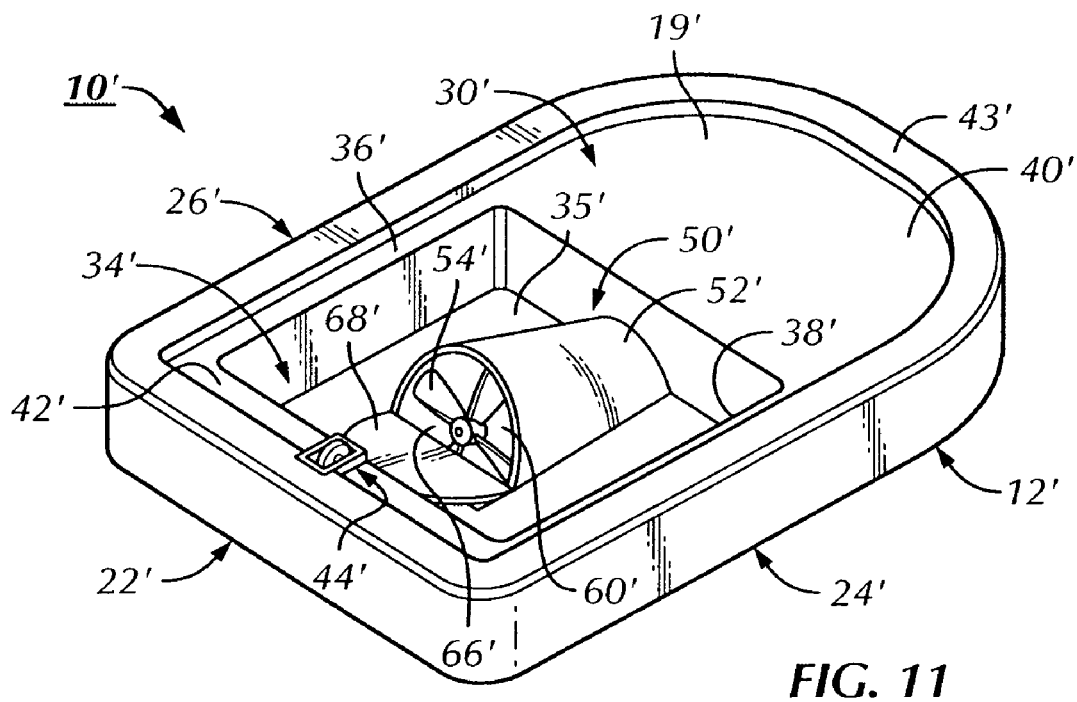
FIG. 11 is a bottom, rear isometric view of the embodiment of the hovercraft of FIG. 8 showing the thrust-lift fan duct flap in an open position.

The decorative housing 11 overlying the thrust-lift fan assembly 50' includes dummy simulated fan housing 15, 17 to simulate housings for two fans, even though only one thrust-lift fan 54' is used, as best shown in FIG. 11. If desired, however, multiple thrust-lift fans 54 could be used, driven either by a single motor or by multiple motors.

Figure 10:
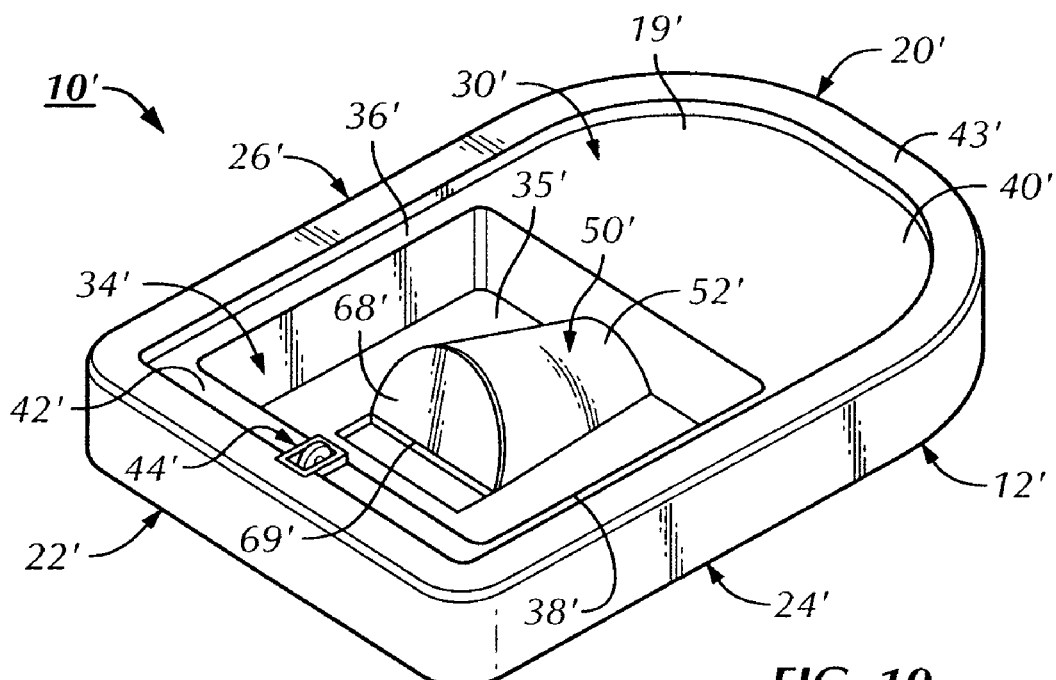
FIG. 10 is a bottom, rear isometric view of the embodiment of the hovercraft of FIG. 8 in which a thrust-lift fan duct flap is in a closed position.
Figure 12:
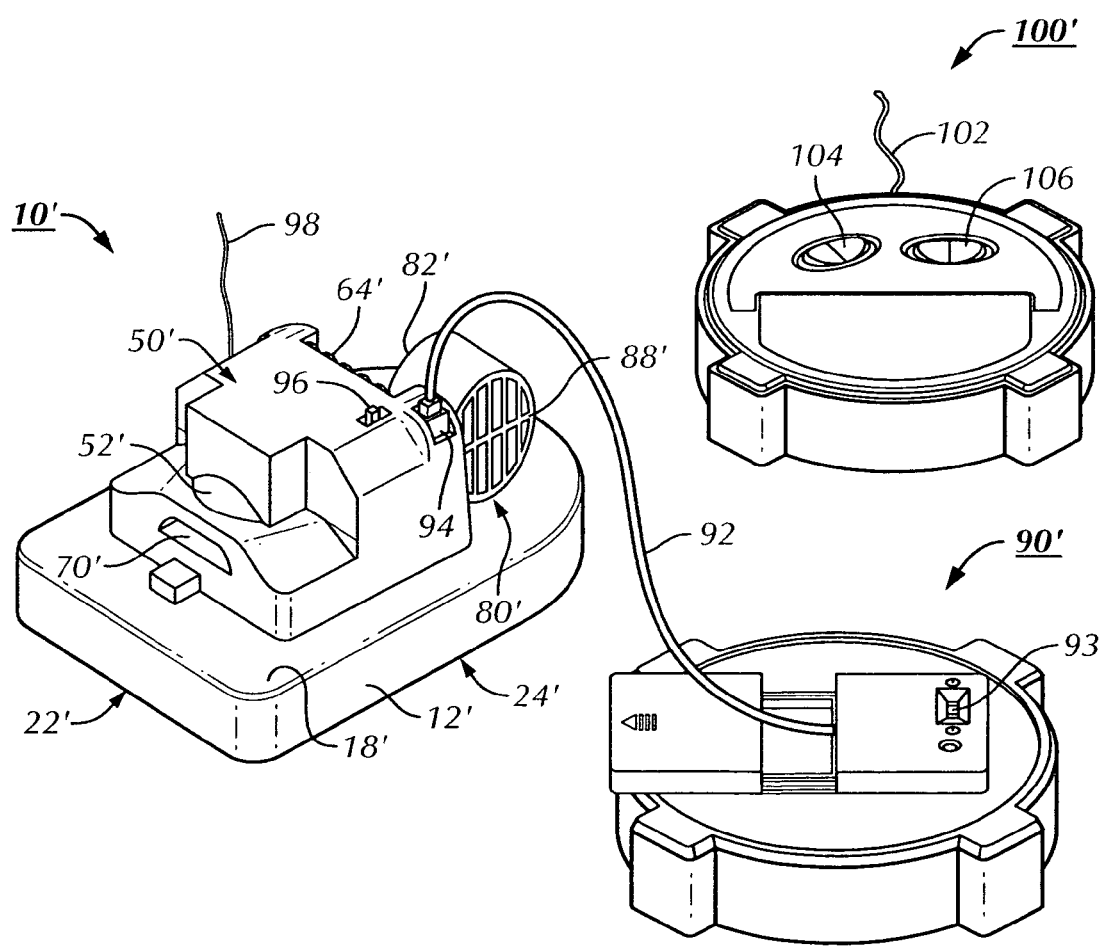
FIG. 12 is a perspective view of the embodiment of the hovercraft of FIG. 8 with a decorative housing removed, along with a wireless remote control transmitter and a power source charging base.

The hovercraft 10' includes a forward end or bow 20', an aft end 22', a first lateral side, such as starboard side 24', a second lateral side, such as port side 26', an upper side 28', and a lower side 30'. A thrust-lift fan assembly 50', best seen in FIGS. 10 and 11, is under the decorative housing 11, while a steering fan assembly 80', best seen in FIG. 12, is under the decorative housing 13. The thrust-lift fan assembly 50' and the steering fan assembly 80' are mounted on a support structure 18' which is preferably unitarily formed with the hull 12'. It is preferred that the hull 12' be made of a buoyant material, such as a molded foam material like polypropylene foam or expanded polypropylene foam, for example.

With reference to FIGS. 10 and 11, the underside portion 19' of the hull 12' has preferably unitarily formed therein, such as by molding, a cavity 34' having a cavity upper wall 35', and defined by a hull underside first side portion (starboard) 36', a hull underside second side portion (port) 38', a hull underside forward portion 40' and a hull underside aft portion 42'. A circumferential lower side portion in the form of a circumferential ledge 43' depends from and circumscribes the cavity 34'. The second embodiment of the hovercraft 10' does not show a separate circumferential tube float member, which could be used, if desired, but is not necessary.

In the hovercraft 10', the thrust-lift fan assembly 50' includes a thrust-lift fan housing 52' that extends into the cavity 34' as best seen in FIGS. 10 and 11. The thrust-lift fan assembly 50' includes the thrust-lift fan 54' driven by a thrust-lift fan motor (not shown), which is preferably a reversible electric motor for the toy hovercraft 10'. The thrust-lift fan assembly 50' includes a thrust-lift fan duct 60' formed by the thrust-lift fan housing 52'. A thrust-lift fan duct inlet 62' is protected by a thrust-lift fan duct inlet grille 64' best seen in FIGS. 8 and 12. The thrust-lift fan duct 60' is in fluid communication with the cavity 34' through a thrust-lift fan duct bottom outlet 66', which may be open as shown in FIG. 11 when a thrust-lift fan duct bottom outlet flap 68' is open, or may be closed, such as shown in FIG. 10 when the thrust-lift fan duct bottom outlet flap 68' is in a closed position. The thrust-lift fan duct bottom outlet flap 68' pivots between an open position and a closed position on a hinge 69'. The outlet flap 68' may be retained in an open position or a closed position by any suitable latches or catches, not shown, or by frictional forces. In the second embodiment of hovercraft 10', the thrust-lift fan duct bottom outlet flap 68' opens outwardly into the cavity 34', rather than inwardly into the thrust-lift fan duct 60', whereas in the first embodiment of the hovercraft 10, the thrust-lift fan duct bottom outlet flap 68 opens inwardly into the thrust-lift fan duct 60. Nevertheless, the functional operation of the thrust-lift fan assembly is the same in both embodiments.

When the thrust-lift fan duct bottom outlet flap 68' is in the open position as shown in FIG. 11, a component of the air passing through the duct 60' enters the cavity 34' and forms a supporting air cushion supporting the lower side 30' of the hovercraft 10'. Another component of the air traveling through the duct 60' exits through a thrust-lift fan duct aft outlet 70' (best seen in FIG. 12) to propel the hovercraft 10' in a forward direction, or in a reverse direction, if the rotation of the thrust-lift fan 54 is reversed. On a smooth, solid surface, a guide wheel assembly 44' functions in the same manner as the guide wheel assembly 44 of the first embodiment of the hovercraft 10.

The second embodiment of the toy hovercraft 10' is steered by a steering fan assembly 80' best seen in FIG. 12. The steering fan assembly 80' includes all of the components of the steering fan assembly 80 of the first embodiment, with the steering fan housing 82' and one of two side grilles 88' visible in FIG. 12. Preferably, the steering fan motor for the toy hovercraft 10' is a reversible electric motor to drive the steering fan in opposite directions as desired.

Preferably, the wireless remote control toy hovercraft 10' is powered by a power source 95 (not shown except schematically in FIG. 13) such as a rechargeable battery or batteries, although a battery or batteries could be provided which are replaceable, rather than rechargeable, if desired. An external charger 90 is illustrated in FIG. 12 as being connected by a power cord 92 to a charging receptacle 94 formed in the housing for the hovercraft 10'. The charging unit also includes an on-off switch 93. An on-off switch 96 is also provided on the housing of the hovercraft 10'. The charging receptacle 94 and on-off switch 96 could be relocated to be accessible to or through the decorative housing 11, if desired.

A receiving unit with appropriate electronic circuitry well known to those skilled in the art of remote control products is also included in the housing of the hovercraft 10'. An antenna 98 receives signals from a transmitter 100 which also includes a transmitting antenna 102 and suitable electronic circuitry which would be well known to those of ordinary skill in the art in view of the present disclosure. The wireless transmitter 100 includes a first control button 104 and a second control button 106. The first control button 104 has a neutral "off" position. When the control button 104 is pressed in a first activated or "on" position, it causes the thrust-lift fan motor to rotate in a first direction, propelling the hovercraft 10' in a forward direction. When the button 104 is activated in a second activated or "on" position, the direction of the thrust-lift fan motor is operated in a reverse direction, causing the hovercraft 10' to move in a reverse direction. The second control button 106 also has a neutral "off" position. When the second control button 106 is activated in a first activated or "on" position, the steering fan motor is rotated in a first direction, causing the hovercraft to steer the hovercraft toward a first lateral side and, in a second activated or "on" position, causes the steering fan motor to rotate in a second direction to generate a second side force tending to steer the hovercraft toward the second lateral side.

Figure 13:
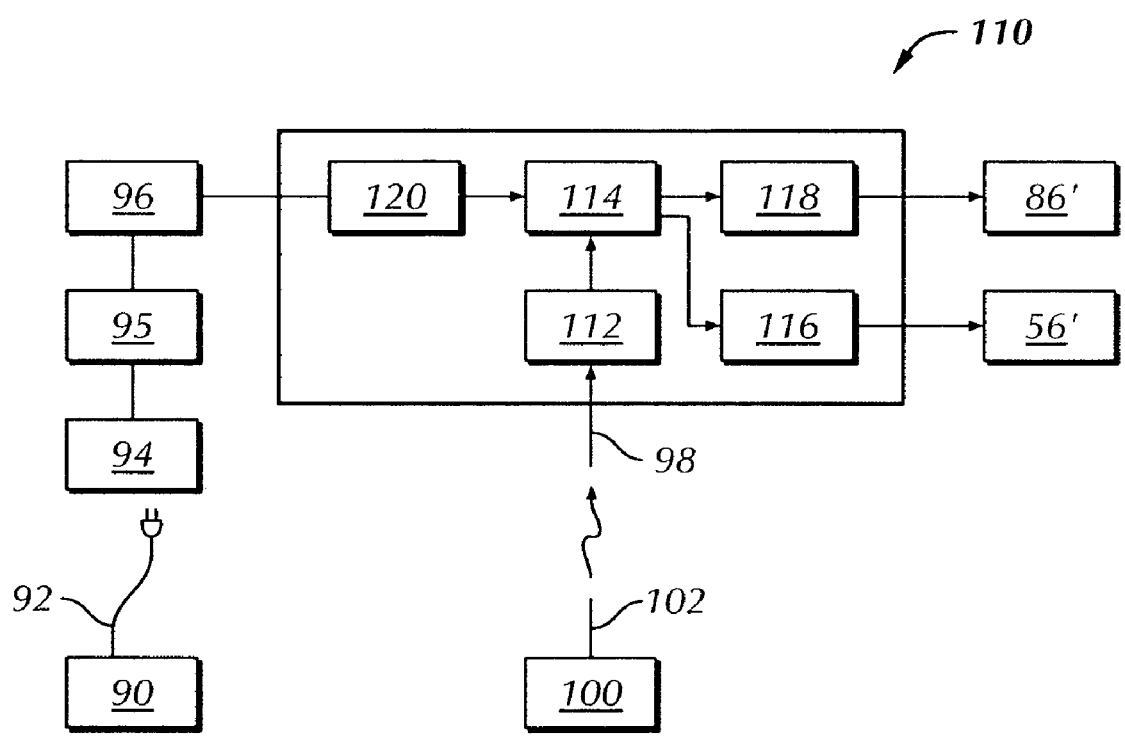
FIG. 13 is a block diagram representation of electrical and electromechanical components of the second embodiment of the hovercraft of FIG. 8.

Control of the wireless remote control toy hovercraft 10' is conventional. FIG. 13 shows a block diagram schematically representing several of the electrical and electromechanical components used in controlling the hovercraft 10'. An optional but preferred external charging unit 90 connects by the power cord 92 to a receptacle 94 to charge a power source 95, such as rechargeable batteries. If replaceable batteries are used instead of rechargeable batteries, the external charger 90, the power cord 92 and the charging receptacle 94 would not be necessary. The on-off switch 96 in the "on" position provides electricity to control circuitry 110. The control circuitry 110 includes a wireless signal receiver circuit 112 for receiving a wireless signal, such as a radio frequency signal, sent by the transmitter 100 through the transmitter antenna 102 and received by the receiver antenna 98 to activate the receiver circuit 112. Controller circuitry 114 directs appropriate signals to the thrust-lift fan motor control circuit 116 which controls the thrust-lift fan motor 56'. The controller circuitry 114 also directs the appropriate signals to a steering fan motor control circuit 118 which controls the operation of the steering fan motor 86'. A power supply circuit 120 controls power to the control circuitry 110 and is connected to the on-off power switch 96.

From the foregoing, it can be seen that the present invention comprises a hovercraft capable of operation on either a solid or liquid surface and further capable of being steered without requiring movable rudders, air vanes or louvers. The hovercraft is easy to control for movement in all directions and, in a miniaturized embodiment, is especially well-suited for use as a toy.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A hovercraft comprising:
   a hull having a forward end and an aft end, first and second lateral sides and upper and lower sides, a central longitudinal axis between the first and second lateral sides,
   a support structure supported by or formed unitarily with the hull;
   a cavity disposed within the hull and having an opening in the lower side, the cavity being surrounded by the hull in a first side portion, a second side portion, a forward end portion and an aft end portion;
   the hull further comprising a circumferential lower side portion extending from the first and second side portions, forward end portion and aft end portion, the circumferential lower side portion surrounding the cavity opening;
   a thrust-lift fan assembly including:
      a thrust-lift fan housing mounted to at least one of the hull and the support structure, the thrust-lift fan housing including a thrust-lift fan duct;
      a thrust-lift fan motor disposed within the thrust-lift fan housing and drivingly coupled with a thrust-lift fan, the thrust-lift fan being supported for rotation within the thrust-lift fan duct;
      the thrust-lift fan duct having an inlet, an aft outlet, and a bottom outlet in fluid communication with the cavity and a supporting surface under the hull;
   a steering fan assembly including:
      a steering fan housing fixedly mounted to at least one of the support structure and the hull;
      a steering fan motor having an axis of rotation generally perpendicular to the central longitudinal axis and being drivingly coupled with a reversible steering fan supported for selective rotation in one of a first direction and in a second direction within the steering fan housing;
   whereby operation of the thrust-lift fan causes air to be expelled through the bottom outlet to generate a lifting force on the hovercraft sufficient to lift the hovercraft from the supporting surface and also causes air to be expelled through the aft outlet to generate a propulsive force on the hovercraft to propel the hovercraft in a forward direction; and
   whereby operation of the steering fan in the first direction of rotation generates a first side force tending to steer the hovercraft toward one of the lateral sides and in the second direction of rotation generates a second side force tending to steer the hovercraft toward the other lateral side.

2. The hovercraft of claim 1, wherein the circumferential lower side portion of the hull comprises a circumferential tube.

3. The hovercraft of claim 2, wherein the tube is inflatable.

4. The hovercraft of claim 1, further comprising a guide wheel supported for rotation about a substantially horizontal axis, the guide wheel being supported by at least one of the hull and the support structure and extending below the lower side portion adjacent the aft end.

5. The hovercraft of claim 1, further comprising a deflector to deflect a portion of air flowing through the thrust-lift fan duct out the bottom outlet and another portion of the air flowing through the thrust-lift fan duct out the aft outlet.

6. The hovercraft of claim 1, wherein the bottom outlet further comprises a bottom outlet flap movable between an open position and a closed position;
   whereby operation of the lift fan with the bottom outlet flap in the open position causes air to be expelled through the bottom outlet to generate a lifting force on the hovercraft sufficient to lift the hovercraft from a solid supporting surface and also causes air to be expelled through the aft outlet to generate a propulsive force on the hovercraft to propel the hovercraft in a forward direction; and
   whereby operation of the thrust-lift fan with the bottom outlet flap in the closed position prevents air from being expelled through the bottom outlet and causes air to be expelled through the aft outlet to generate a propulsive force on the hovercraft sufficient to propel the hovercraft forward when the hovercraft is floating on a supporting liquid.

7. The hovercraft of claim 6, further comprising a deflector to deflect a portion of air flowing through the thrust-lift fan duct out the bottom outlet and another portion of the air flowing through the thrust-lift fan duct out the aft outlet, wherein the deflector has a forward end and an aft end, and the bottom outlet flap is hingedly disposed adjacent the forward end of the deflector.

8. The hovercraft of claim 1, wherein the steering fan housing is forward of the thrust-lift fan housing.

9. The hovercraft of claim 1, wherein the support structure and the hull are a unitary construction.

10. A toy hovercraft comprising:
    a hull having a forward end and an aft end, first and second lateral sides and upper and lower sides, a central longitudinal axis between the first and second lateral sides,
    a support structure supported by or formed unitarily with the hull;
    a cavity disposed within the hull and having an opening in the lower side, the cavity being surrounded by the hull in a first side portion, a second side portion, a forward end portion and an aft end portion;
    the hull further comprising a circumferential lower side portion extending from the first and second side portions, forward end portion and aft end portion, the circumferential lower side portion surrounding the cavity opening;
    an electrical power source;
    a thrust-lift fan assembly including:
       a thrust-lift fan housing mounted to at least one of the hull and the support structure, the thrust-lift fan housing including a thrust-lift fan duct;
       an electric thrust-lift fan motor disposed within the thrust-lift fan housing and operatively coupled to the electrical power source and drivingly coupled with a thrust-lift fan, the thrust-lift fan being supported for rotation within the thrust-lift fan duct;
       the thrust-lift fan duct having an inlet, an aft outlet, and a bottom outlet in fluid communication with the cavity and a supporting surface under the hull;
    a steering fan assembly including:
       a steering fan housing fixedly mounted to at least one of the support structure and the hull;
       an electric, reversible steering fan motor having an axis of rotation generally perpendicular to the central longitudinal axis and being operatively coupled to the electrical power source and drivingly coupled with a steering fan supported for selective rotation in one of a first direction and in a second direction within the steering fan housing;

whereby operation of the thrust-lift fan causes air to be expelled through the bottom outlet to generate a lifting force on the hovercraft sufficient to lift the toy hovercraft from the supporting surface and also causes air to be expelled through the aft outlet to generate a propulsive force on the hovercraft to propel the toy hovercraft in a forward direction; and whereby operation of the steering fan in the first direction of rotation generates a first side force tending to steer the toy hovercraft toward one of the lateral sides and in the second direction of rotation generates a second side force tending to steer the toy hovercraft toward the other lateral side.

11. The toy hovercraft of claim 10, wherein the circumferential lower side portion of the hull comprises a circumferential tube.

12. The toy hovercraft of claim 11, wherein the tube is inflatable.

13. The toy hovercraft of claim 10, further comprising a guide wheel supported for rotation about a substantially horizontal axis, the guide wheel being supported by at least one of the hull and the support structure and extending below the lower side portion adjacent the aft end.

14. The toy hovercraft of claim 13, wherein the guide wheel is spring-biased substantially vertically in a lowermost position.

15. The toy hovercraft of claim 10, further comprising a deflector to deflect a portion of air flowing through the thrust-lift fan duct out the bottom outlet and another portion of the air flowing through the thrust-lift fan duct out the aft outlet.

16. The toy hovercraft of claim 10, wherein the bottom outlet further comprises a bottom outlet flap movable between an open position and a closed position;

whereby operation of the thrust-lift fan with the bottom outlet flap in the open position causes air to be expelled through the bottom outlet to generate a lifting force on the hovercraft sufficient to lift the toy hovercraft from a solid supporting surface and also causes air to be expelled through the aft outlet to generate a propulsive force on the toy hovercraft to propel the toy hovercraft in a forward direction; and whereby operation of the thrust-lift fan with the bottom outlet flap in the closed position prevents air from being expelled through the bottom outlet and causes air to be expelled through the aft outlet to generate a propulsive force on the toy hovercraft sufficient to propel the hovercraft forward when the toy hovercraft is floating on a supporting liquid.

17. The toy hovercraft of claim 16, wherein the bottom outlet flap is connected by a hinge at a location adjacent an aft lower portion of the bottom outlet of the thrust-lift fan duct.

18. The toy hovercraft of claim 17, wherein the bottom outlet flap has sealing edges and is rotatable from a closed position where the sealing edges abut edges of the thrust-lift fan air duct surrounding the bottom outlet to an open position where the bottom outlet flap is rotated to a position within the lift fan air duct such that air flows out both the bottom outlet and the rear outlet.

19. The toy hovercraft of claim 16, further comprising a deflector to deflect a portion of air flowing through the thrust-lift fan duct out the bottom outlet and another portion of the air flowing through the lift fan duct out the aft outlet, wherein the deflector has a forward end and an aft end, and the bottom outlet flap is hingedly disposed adjacent the forward end of the deflector.

20. The toy hovercraft of claim 10, wherein the steering fan housing is forward of the thrust-lift fan housing.

21. The toy hovercraft of claim 20, wherein the support structure and the hull are a unitary construction.

22. A wireless remote control toy hovercraft set comprising the toy hovercraft of claim 10 and a wireless remote control transmitter assembly, for controlling the toy hovercraft the wireless remote control transmitter assembly comprising a transmitter for transmitting signals to a receiver and a power source; a receiver assembly associated with the hovercraft and comprising a receiver for receiving signals transmitted from the transmitter assembly, and a power source; electronic circuitry adapted for causing the thrust-lift fan motor to turn on and off when a first control button on the transmitter assembly is respectively activated and not activated, the electronic circuitry also adapted for causing the steering fan motor to turn on in the first direction, to turn on in the second direction and to turn off when a second control button is respectively activated in first and second on positions and in an off position.

* * * * *